Dec. 12, 1967   M. J. LOWDERMILK   3,357,250
TEMPERATURE DETECTOR AND SAMPLING DEVICE
Filed April 12, 1965
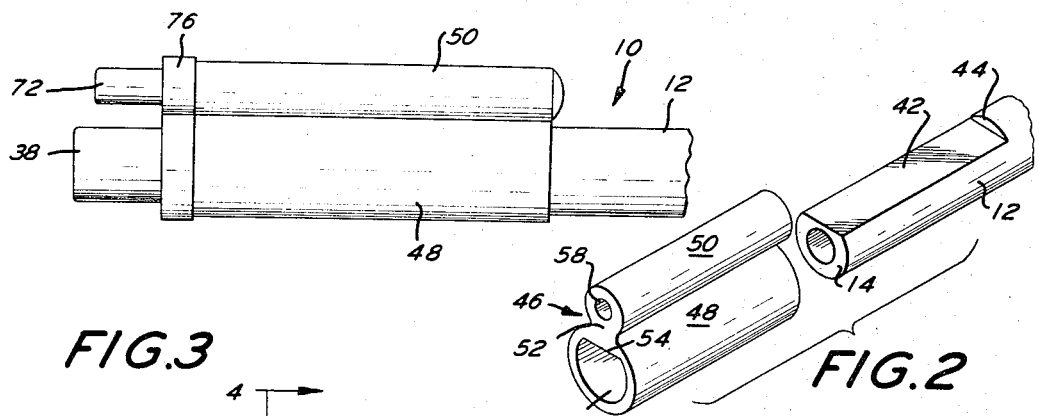
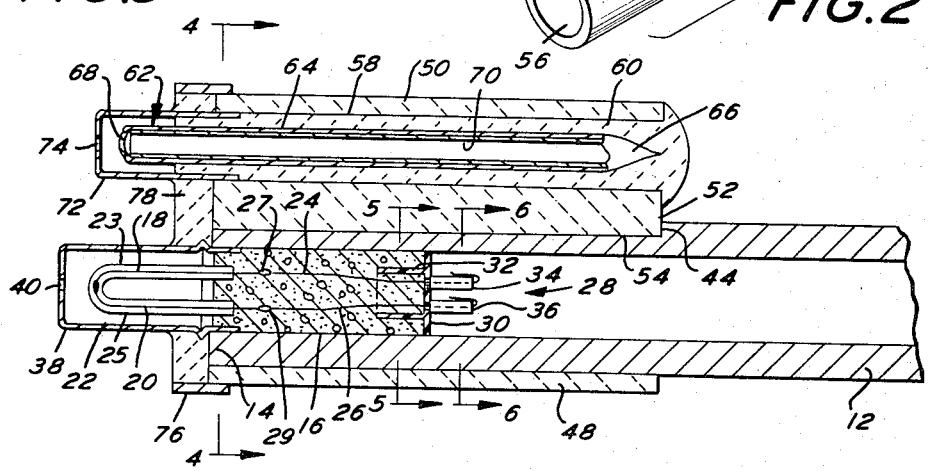
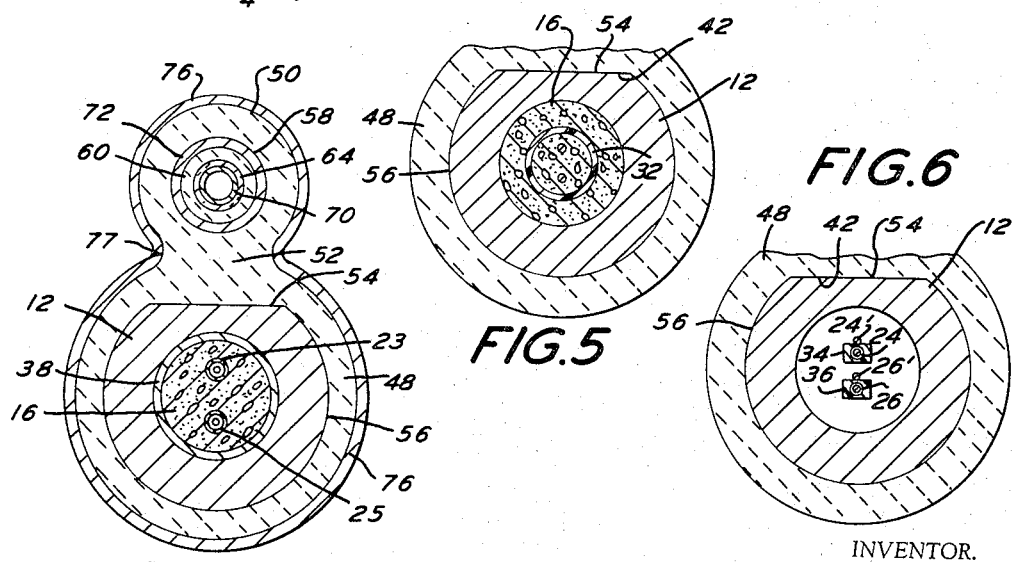
INVENTOR.
MARVIN J. LOWDERMILK
BY
*Seidel & Gonda*
ATTORNEYS.

United States Patent Office 3,357,250
Patented Dec. 12, 1967

3,357,250
TEMPERATURE DETECTOR AND SAMPLING DEVICE
Marvin J. Lowdermilk, Haddonfield, N.J., assignor to Electro-Nite Co., a corporation of Pennsylvania
Filed Apr. 12, 1965, Ser. No. 447,229
5 Claims. (Cl. 73—354)

ABSTRACT OF THE DISCLOSURE

Expendable apparatus simultaneously sampling and indicating the temperature of molten metal having a temperature in excess of 500° F. is provided. The sample is retrieved by an insulated vessel having its inlet end protected by a fusible member with the inlet end positioned adjacent to the location where the temperature of the bath will be measured by a thermocouple.

---

This invention relates generally to a temperature detector and sampling device. More particularly, the present invention is directed to a combined thermocouple unit for detecting temperature and a sampling device for obtaining a sample of the bath.

In many fields of industry, such as the steel industry, it is desirable to take the temperature of a bath. Also, it is desirable to obtain a sample of the bath at periodic intervals. The present invention enables these two objects to be accomplished simultaneously at a minimum of expense, a minimum of effort by unskilled personnel, and at the same time provide a sample which is directly correlated to the temperature sensed. Thus, the present invention enables a sample to be taken at the same elevation in the bath that the temperature was sensed and at the same time that the temperature reading was obtained. Accordingly, the meaning attributed to the samples and temperature readings may be more accurately correlated without interpolation thereby providing more reliable information.

In accordance with the present invention, an expendable thermocouple unit is supported on one end of an expendable body such as a cardboard tube. A sampling device is likewise supported at said one end of said body. In the preferred embodiment of the present invention, the sampling device and thermocouple unit are disposed side by side. This embodiment is preferred over an arrangement wherein the thermocouple unit and sampling device are disposed along the same axis or physically disposed within the same insulating structure.

It is an object of the present invention to provide a novel temperature sensing detector and sampling device.

It is another object of the present invention to provide novel apparatus for immersing into a high temperature bath and facilitate obtaining a sample of the bath while simultaneously obtaining a signal indicative of the temperature of the bath at the area immediately adjacent the point where the sample was obtained.

It is another object of the present invention to provide novel apparatus which is simple, economical, and reliable while providing information as to the nature of a bath and temperature thereof.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a partial side elevation view of the apparatus of the present invention.

FIGURE 2 is a partial perspective view of the apparatus illustrated in FIGURE 1.

FIGURE 3 is a longitudinal sectional view of the apparatus illustrated in FIGURE 1.

FIGURE 4 is a sectional view taken along the line 4—4 in FIGURE 3.

FIGURE 5 is a sectional view taken along the line 5—5 in FIGURE 3.

FIGURE 6 is a sectional view taken along the line 6—6 in FIGURE 3.

Referring to the drawing in detail, wherein like numerals indicate like elements, there is illustrated in FIGURE 1 a portion of apparatus designated generally as 10.

The apparatus 10 includes a temperature detector and sampling device mounted and supported by one end of an expendable body such as cardboard tube 12. Tube 12 has an end 14. Tube 12 may have a length anywhere from one foot to ten feet depending upon the nature of the equipment within which is disposed a bath of material at an elevated temperature. Cardboard tube 12 is preferably of the type currently being used in connection with expendable thermocouples.

An expendable thermocouple unit is supported within the end of tube 12. Such thermocouple unit includes a mass of heat insulating refractory 16 which is preferably a commercially available material known as Sauerisen cement No. 1, 7 or 8. A thermocouple wire 18 is connected to a thermocouple wire 20 to form a hot junction within and at the bight portion of a U-shaped refractory tube 22. Tube 22 is preferably made from Vycor and has legs 23 and 25. The free ends of legs 23 and 25 are imbedded in the refractory 16.

Thermocouple wire 18, for example, may be a platinum wire while wire 20 may be a platinum rhodium wire. Wire 18 is connected to a No. 11 alloy wire 24 to form a cold junction 27. Wire 20 is connected to a copper wire 26 to form a cold junction 29. The junctions 27 and 29 are imbedded in the refractory 16.

A connector 28 is imbedded in the end of the refractory 16 remote from the U-shaped tube 22. Connector 28 is preferably made from a flexible non-conductive material such as a polymeric plastic. Preferably, connector 28 is made from polyethylene. Connector 28 includes a flat base portion 30 having a circular skirt 32. Skirt 32 is imbedded within the refractory 16. A pair of parallel hollow projections 34 and 36 extend in an axial direction from the base portion 30 and in line with holes in the base portion 30.

Wire 24 extends through the skirt 32, the hole in the base portion 30, through the projection 34, and is bent so as to provide a portion 24' extending along the outer periphery of portion 34. Wire 26 extends through the skirt 32, the hole in the base 30, and through the projection 36. Wire 26 also terminates in an end portion 26' which extends along the outer periphery of portion 36. As shown more clearly in FIGURE 6, portion 26' is adjacent the longitudinal axis of tube 12 whereas portion 24' is approximately halfway between the inner periphery of tube 12 and the longitudinal axis thereof. Connector 28 is adapted to cooperate with a receptacle regardless of the angular rotative position of the thermocouple unit with respect to the receptacle. Such receptacles are presently known to those skilled in the art and have been used commercially on an extensive scale. Accordingly, a more detailed description of the same is not deemed necessary.

The thermocouple unit also includes a hollow cup-shaped cap 38. Cap 38 may have a hole 40 in the closed end thereof. The open end of the cap 38 is imbedded in the refractory 16. Preferably, the thermocouple unit is made by positioning the above-described component except for the cap 38, in a mold and thereafter pouring the refractory material into the mold whereby it may solidify and join the elements together as a unit. Thereafter, the unit is force-fitted into the end of the tube 12.

As shown more clearly in FIGURES 2 and 3, the end portion of tube 12 is provided with a flat surface 42 extending from face 14 to a shoulder 44. Flat face 42 may be provided by grinding. The distance between surface 42 and the inner periphery of tube 12 is approximately one-half the thickness of the tube 12 in a radial direction.

As shown more clearly in FIGURE 2, there is provided a body of heat insulating temperature resistant material 46. Body 46 is preferably an extruded refractory such as Sauerisen cement. Alternatively, body 46 may be placed in a mold as a powder and pressed to the desired shape and thereafter fired.

The body 46 is provided with a first portion 48 and a second portion 50 interconnected by a web 52. Portions 48 and 50 are generally cylindrical in cross section. Portion 48 is provided with a chordal flat surface 54 forming a part of bore 56. Bore 56 corresponds to the peripheral shape of the mating end portion of tube 12. The length of body 46 corresponds to the distance between face 14 and shoulder 44.

Portion 50 is provided with a cylindrical bore 58. A sampling device designated generally as 62 is coaxially disposed within bore 58 and fixedly supported therewithin by a refractory 60. Refractory 60 may be a Sauerisen cement as referred to above. Preferably, the device 62 is positioned upright within the bore 58 and the cement 60 is poured into the bore 58 and permitted to solidify.

The device 62 includes an evacuated vessel 64 closed at one end 66 in any conventional manner such as by heating and crimping. The vessel 64 may be made from any high temperature vacuum-type vitreous or ceramic material such as quartz, Vycor, etc. The other end of vessel 64 is closed by a button or window 68. Button 68 is preferably a vitreous material having a much lower temperature melting point than the vessel 64. With a quartz vessel 64, a suitable material for button 68 may be GSC No. 1 sealing glass. Button 68 should preferably have a coefficient of expansion compatible with vessel 64 to prevent cracking when subjected to heat shock.

When the bath into which the apparatus 10 will be immersed is a steel bath, vessel 64 will be provided with a means for killing the steel. As illustrated, the means for killing the steel is a layer of aluminum foil 70. The aluminum foil 70 is rolled into the form of a hollow tube to provide maximum surface area for contact with the molten steel sample. The means for killing the steel may assume other forms, such as aluminum powder, an aluminum coating on the inner surface of vessel 64, etc.

Vessel 64 may be constructed from a quartz tube which is open at both ends. Button 68 may be fused to one end of the quartz tube. Thereafter, the aluminum foil 68 may be inserted into the tube, the tube evacuated, and then end 66 closed by applying heat and crimping the same. The amount of aluminum foil is preferably an amount so that the aluminum constitutes approximately one percent of the volume of the steel which can be received within vessel 64. Button 68 and vessel 64 are provided with a protective cap 72 which may have a hole 74 in the closed end thereof.

A tape 76 having end 77 extends around the body 46 and projects forwardly so as to define a well. A refractory 78 such as Sauerisen cement of the type referred to above is then poured into the well and permitted to solidify. The refractory 78 retains the caps 38 and 72 in proper disposition and provides a layer refractory across the face 14 on the tube 12. The button 68 projects beyond the exposed face of the refractory 78 by a distance which is between three and five times the inner diameter of the vessel 64. It has been found that more uniform results have been obtained with this structural interrelationship. When this dimension is substantially less than this range, there is a tendency for the molten metal entering the vessel 64 to solidify before the entire vessel is filled. When the dimension is greater than this range, there is a tendency for the molten metal to run out through the open end of the vessel 64 when the apparatus is being removed from the bath thereby resulting in a sample which does not completely fill the vessel 64. The refractory 60 as well as the body 46 acts as an insulator for the molten sample which enters the vessel 64 and enhances solidification of the same while the apparatus is disposed within the bath.

The depth of immersion of the apparatus 10 is not critical. The depth of immersion should be sufficient so as to place the entire body 46 below the slag layer. In an actual immersion, it is contemplated that the body 46 will have a length of approximately 3 to 4 inches. The length of time for the immersion is not critical and generally is a function of the percent of carbon, temperature range, etc. For example, in a steel bath having 30 points of carbon and a temperature of 2,825° F., the length of time for the immersion is preferably 7 to 8 seconds. In general, the immersion time will be between 3 and 10 seconds.

The body 46 is force-fitted onto the end of tube 12. The juxtaposed flat surfaces 42 and 54 prevents the body 46 from rotating relative the tube 12 during handling as well as during immersion. That is, the buoyancy of the bath would tend to rotate portion 50 with respect to tube 12 and thereby interfere with a proper sample entering the vessel 64.

The apparatus 10 is utilized as follows:

The apparatus 10 as illustrated in the drawings is provided as a pre-assembled unit. The tube 12 is telescoped over a supporting structure in the form of a steel tube or rod having a non-directional coupling receptacle at its free end. The tube 12 will be slid over the steel tube untile the receptacle mates with the connector 28. Proper mating can be ascertained by the indicator light on recorder apparatus. Thereafter, the steel tube or pole is utilized to immerse the appartus 10 into a bath. The apparatus 10 is permitted to remain in the bath between 3 and 10 seconds. During this time, the thermocouples will generate an EMF which is indicative of the temperature of the bath and which will be recorded by use of conventional equipment. Simultaneously, the button 68 fused on the tube 64 will melt and thereby permit a specimen of the bath to enter and partially solidify within the vessel 64. The caps 38 and 72 will have previously melted away during passage of the apparatus 10 through the slag layer on the bath.

Thereafter, the appartus 10 will be removed from the bath and removed from the supporting pole or tube. The portion 50 and refractory 60 will be cracked by application of a force thereto such as by hitting the same with a hammer. The vessel 64 will also crack and thereby facilitate access to the specimen of killed steel within the vessel 64. The remaining components of the apparatus 10 are discarded. The specimen retrieved may then be analyzed and a notation made of the temperature of the bath in the immediate area and at the time that the specimen was obtained. When a new sample and temperature reading are desired, the above steps are repeated.

One of the mapor advantages to be obtained by the apparatus of the present invention is the ability to have a sample of the bath at a precise temperature as indicated by the thermocouple and the recording on the recorder chart. The same having been obtained by one immersion of the combined temperature detector and sampling device of the present invention.

Except for the sample retrieved, all of the components illustrated in the drawings are expendable since they are used only once and then discarded. Since there is little oxygen below the bath level, the portion of the cardboard tube below the bath level does not burn. The amount of oxygen above the bath level is limited and this will cause the portion of the tube 12 above the bath level to be partially charred. For certain baths wherein there is no slag layer, such as a bath of molten copper, the position of end 66 and button 68 on the vessel may be reversed. In this manner, it may not be necessary to evacuate vessel 64 since the sample may enter the vessel 64 by gravity. For steel baths, it is preferred to use an evacuated vessel 64 with the fusible button 68 pointing downwardly into the bath with resultant entry of the molten steel entering the vessel 64 to fill up the evacuated interior of the vessel 64.

It is known that there are stratifications in the bath level. Hence, the provision of apparatus 10 wherein the vessel 64 is disposed side by side along the thermocouple is preferred as opposed to having the vessel 64 and thermocouple unit at spaced points along the longitudinal axis of tube 12. As will be apparent from the above disclosure, the body 46 performs the function of insulating both the vessel 64 as well as the cold junctions and the connector 28 from the heat of the bath. While the body 46 is preferably made from a refractory, it may also be made from heat insulating materials such as asbestos, cardboard, or paper, vitreous materials, etc. The apparatus 10 is adapted for use in baths at elevated temperatures. By elevated temperatures, it is meant between about 500° F. and 4,000° F.

The present invention may be embodied in other specific forms without departing from the spirit or essential attributes thereof and, accordingly, reference should be made to the appended claims, rather than to the foregoing specification as indicating the scope of the invention.

I claim:

1. Expendable apparatus for sampling and simultaneously indicating the temperature of molten metal in a bath having a temperature in excess of 500° F. comprising a hollow tube of heat insulating expendable material, an expendable thermocouple unit fixedly supported by said tube at one end thereof, an evacuated sampling vessel for receiving a sample of hot molten metal while the temperature of the metal is being detected by the thermocouple unit, means mounting said vessel on said one end of said tube, said mounting means including a heat insulating refractory body surrounding said vessel for the major portion of the length of said vessel, said refractory body also extending around a substantial portion of said thermocouple unit, said thermocouple unit and vessel being substantially shorter than said tube, the hot junction of said thermocouple unit being supported beyond one end of said tube and refractory body, said vessel having an inlet end projecting beyond said one end of said tube and refractory body and having a closed end in said body, said vessel inlet end being closed and protected from the molten metal by a means adapted to be melted by the bath to permit entry of a sample of the bath into the vessel.

2. Apparatus in accordance with claim 1 wherein said refractory body also surrounds at least a portion of said tube, and means to prevent rotation of said refractory body with respect to said expendable tube.

3. Apparatus in accordance with claim 2 wherein said last-mentioned means includes a flat face on said refractory engaging a flat face on said expendable tube.

4. Apparatus in accordance with claim 1 wherein said thermocouple unit terminates within said expendable tube at a connector, a heat insulating refractory mass within said expendable tube, said connector being fixed to said refractory mass, said connector being made from a flexible polymeric material, said connector including two axially projecting portions each having a portion of a wire extending therealong, each wire being connected to one of a pair of thermocouple elements, each thermocouple element extending through one leg of a U-shaped tube supported by said mass.

5. Apparatus in accordance with claim 1 wherein said vessel has one end projecting beyond a face of said insulating refractory by a distance corresponding to about three to five times the internal diameter of said vessel, said last-mentioned means protecting the inlet end of said vessel being a fusible vitreous material.

References Cited

UNITED STATES PATENTS

| 1,210,487 | 1/1917 | Kaul | 73—354 |
| 1,769,533 | 7/1930 | Nash et al. | 73—354 |
| 1,979,737 | 11/1934 | Francis | 73—425.2 |
| 2,485,492 | 10/1949 | Hubbard et al. | 73—425.2 |
| 2,970,350 | 2/1961 | Feichtinger | 22—73 |
| 3,038,951 | 6/1962 | Mead | 136—234 |

FOREIGN PATENTS

| 11,722 | 3/1907 | Great Britain. |
| 290,758 | 5/1928 | Great Britain. |

LOUIS R. PRINCE, *Primary Examiner.*

F. SHOON, *Assistant Examiner.*